(12) United States Patent
Motomatsu

(10) Patent No.: US 7,623,215 B2
(45) Date of Patent: Nov. 24, 2009

(54) METHOD OF MANUFACTURING LIQUID CRYSTAL DISPLAY PANEL

(75) Inventor: Toshihiko Motomatsu, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 221 days.

(21) Appl. No.: 10/960,500

(22) Filed: Oct. 8, 2004

(65) Prior Publication Data

US 2005/0078267 A1 Apr. 14, 2005

(30) Foreign Application Priority Data

Oct. 9, 2003 (JP) ............................. 2003-351092

(51) Int. Cl.
*G02F 1/1339* (2006.01)

(52) U.S. Cl. ....................... 349/190; 349/153

(58) Field of Classification Search ........................ None
See application file for complete search history.

(56) References Cited

U.S. PATENT DOCUMENTS

| | | | | |
|---|---|---|---|---|
| 4,640,583 A | * | 2/1987 | Hoshikawa et al. | 349/153 |
| 5,956,112 A | * | 9/1999 | Fujimori et al. | 349/156 |
| 5,978,065 A | * | 11/1999 | Kawasumi et al. | 349/188 |
| 6,137,559 A | * | 10/2000 | Tanaka et al. | 349/153 |
| 6,222,603 B1 | * | 4/2001 | Sakai et al. | 349/153 |
| 6,392,735 B1 | * | 5/2002 | Tani | 349/156 |
| 7,102,726 B2 | * | 9/2006 | Byun et al. | 349/189 |
| 2004/0160566 A1 | * | 8/2004 | Kawabe et al. | 349/153 |

FOREIGN PATENT DOCUMENTS

| JP | 11-326922 | 11/1999 |
|---|---|---|
| JP | 2002-14360 | 1/2002 |

* cited by examiner

*Primary Examiner*—David Nelms
*Assistant Examiner*—Lucy P Chien
(74) *Attorney, Agent, or Firm*—Young & Thompson

(57) ABSTRACT

A method of manufacturing a liquid crystal panel, in which a first seal for surrounding a display area is formed on one of a pair of substrates opposite to each other; a second seal for forming a reduced-pressure area is formed outside the display area; a liquid crystal material is dropped in a reduced-pressure state; thereafter, the other substrate is adhered thereto; and the first and second seals are hardened while pushing the substrates from the outsides thereof in an atmospheric pressure state, thus sealing the liquid crystal material. A dropped area of the liquid crystal material is defined satisfy: $2.5b \leqq a \leqq 5b$ where "a" is an interval between an internal peripheral portion of the first seal and an external peripheral portion, and "b" is an interval between an external peripheral portion of the first seal and an internal peripheral portion of the second seal.

13 Claims, 10 Drawing Sheets

PRIOR ART

METHOD OF MANUFACTURING LIQUID CRYSTAL DISPLAY PANEL

BACKGROUND OF THE INVENTION

1. Field of the Invention

The present invention relates to a method of manufacturing a liquid crystal display panel, and particularly to a method of manufacturing a liquid crystal display panel in which liquid crystal is sealed using a dispenser method.

2. Description of the Prior Art

As a display device of an Audio-Visual (AV) machines and an Office Automation (OA) machines, a liquid crystal display (LCD) panel has been widely used because of its merits including a thin thickness, a light weight, a low power consumption and the like. In the LCD panel, liquid crystal is injected into a pair of substrates opposite to each other. In the LCD panel, an alignment direction of liquid crystal molecules is controlled by an electric field generated by an electrode provided in the substrate, and light irradiated onto the LCD panel is modulated, whereby an image is displayed. For such an LCD panel, recently, demands for a high definition, a larger screen and the like have become stronger. Then, in order to improve a display quality, it is important to inject the liquid crystal between the substrates opposite to each other while keeping a uniformity of a gap between the substrates.

As an injection method of the liquid crystal, there is the following method. Specifically, opposite substrates are adhered to each other except for an area thereof serving as a liquid crystal injection hole by use of a sealing material. Thereafter, the adhered substrates are put in a vacuum container and the vacuum container is brought into in a reduced-pressure state. The pressure in the vacuum container is restored to atmospheric pressure in a state where the liquid crystal injection hole is dipped in the liquid crystal, and thus the liquid crystal is injected by use of differential pressure. There is also a method in which opposite substrates are adhered to each other except for an area thereof serving as a liquid crystal injection hole and an air exhaustion port by a sealing material, the liquid crystal injection hole is dipped in the liquid crystal, and the liquid crystal is sucked therein by exhausting air from the air exhaustion port. Furthermore, there is the following method (hereinafter referred to as a dispenser method). Specifically, under a reduced-pressure atmosphere in a vacuum container or the like, a sealing material is coated onto one substrate, liquid crystal is dropped thereonto, and the other substrate is adhered to the one substrate. Thereafter, the pressure in the vacuum container is restored to atmospheric pressure, and thus the sealing material is hardened (For example, refer to Japanese Patent Laid-Open Hei No. 11 (1999)-326922).

In the method in which the liquid crystal is injected by use of the differential pressure or the air exhaustion, the liquid crystal injection port need to be sealed by resin or the like after the liquid crystal injection. A problem that air bubbles are mixed into the liquid crystal from this sealed portion occurs, a problem that the liquid crystal is contaminated with the sealing material occurs, and other problems occur. The dispenser method can shorten an injection time of the liquid crystal drastically compared to other methods. Furthermore, since a required amount of expensive liquid crystal can be reduced, the dispenser method is one that can reduce a cost of an LCD panel. Particularly, the dispenser method is one that is expected in a large-sized LCD panel.

In the above described dispenser method, generally, liquid crystal is injected by use of a first seal (also called a main seal) formed so as to surround a display area and a second seal (also called an auxiliary seal) formed outside the first seal. Furthermore, this dispenser method is roughly classified into two. One is a method in which the second seal is formed to a shape that is a closed curved, and the other is a method in which the second seal is formed to a shape that is an open curved.

Among the two methods, the dispenser method in which the second seal is formed to the shape that is the closed curved will be described with reference to FIG. 1 and FIG. 2. FIG. 1 is a plan view showing a state where liquid crystal is dropped in the method of manufacturing an LCD panel using the conventional dispenser method, and FIG. 2 is a sectional view taken along the line II-II of FIG. 1, which shows a state where substrates opposite to each other are adhered.

First, a sealing material made of ultraviolet cured resin or the like is coated onto one of the pair of substrates opposite to each other (herein a first substrate 2) by use of a screen printing method, a dispenser rendering method or the like. The first substrate 2 has a surface that has been subjected to an alignment treatment. Subsequently, a first seal 4 for defining an area where a liquid crystal material 6 is sealed is formed so as to surround a display area, and a second seal 5 for forming a reduced-pressure area is formed outside the first seal 4 so as to surround the first seal 4.

Next, under a reduced-pressure atmosphere, a proper amount of the liquid crystal material 6 is dropped onto the display area surrounded by the first seal 4 by use of a dispenser for dropping liquid crystal, or the like (see FIG. 1). Subsequently, the other substrate (herein a second substrate 3) in which spacers 7 such as polymer beads and silica beads are scattered is allowed to match the first substrate 2. Thereafter, the vacuum container is restored to an atmospheric pressure state, and both substrates are pushed to each other as shown by the arrows of FIG. 2 by use of the differential pressure between reduced pressure and atmospheric pressure. Thus, the first and second seals 4 and 5 are squeezed, and a desired gap is formed. Then, the first and second seals 4 and 5 are completely hardened, and the liquid material 6 is sealed. Thereafter, the first and second substrates 2 and 3 are cut at predetermined portions thereof outside the first seal 4, thus obtaining a liquid crystal display panel.

And, in the method of manufacturing an LCD panel using the above described dispenser method, the opposite substrates are adhered to each other and brought into the reduced-pressure state in the vacuum container, and then the vacuum container is restored to the atmospheric pressure state. With such way, both substrates are pushed from the outsides thereof by a first reduced-pressure area 8 in the first seal 4 and a second reduced pressure area 9 formed between the first and second seals 4 and 5, and the seal material is squeezed, thus forming a desired gap.

However, when the balance of the pushing forces between the first and second reduced-pressure areas 8 and 9 is lost, a uniform gap cannot be formed from the center of the LCD panel to the periphery thereof.

Particularly, as in the method disclosed in the above described publication, in the method in which the liquid crystal material 6 is dropped onto the center of the display area, an interval between the first seal 4 and an area where the liquid crystal material 6 is dropped (hereinafter referred to as a dropped area) is large, and the first reduced-pressure area 8 is made too flat more than necessary as shown in FIG. 2. Accordingly, the gap becomes un-uniform, thus degrading display quality remarkably.

The present invention has been made in view of the above described problems, and a main object of the present invention is to provide a method of manufacturing the LCD panel capable of improving the display quality by making the gap between the substrates opposite to each other uniform.

SUMMARY OF THE INVENTION

In the method of manufacturing the LCD panel using the dispenser method, a method of manufacturing an LCD panel of the present invention makes to define the relation between the interval between the internal peripheral portion of the first seal and the external peripheral portion of the dropped area of the liquid crystal and the interval between the external peripheral portion of the first seal and the internal peripheral portion of the second seal. Thus, the present invention can make uniform the pushing force in the peripheral portion of the LCD panel at the time of adhering the substrates to each other, and thus the gap between the substrates in the peripheral area of the LCD panel can be made to be uniform, thus improving the display quality.

A first aspect of a method of manufacturing an LCD panel of the present invention comprises the steps of: forming a first seal, which defines an area for sealing a liquid crystal, on one of a pair of substrates opposite to each other, so as to surround a display area; forming a second seal, which forms a reduced-pressure area, outside the first seal, so as to surround the first seal; dropping the liquid crystal onto a predetermined area inside the first seal; adhering the other substrate to the one substrate at a reduced-pressure state; and hardening the first and second seals to seal the liquid crystal while pushing the pair of the substrates from the outsides thereof at an atmospheric pressure state, wherein a dropped area of the liquid crystal is defined so as to satisfy a relation represented by an inequality: $2.5b \leq a \leq 5b$ where "a" is an interval between an internal peripheral portion of the first seal and an external peripheral portion of the dropped area of the liquid crystal, and where "b" is an interval between an external peripheral portion of the first seal and an internal peripheral portion of the second seal.

A second aspect of the method of manufacturing an LCD panel of the present invention comprises the steps of: forming a first seal, which defines an area for sealing a liquid crystal, on one of a pair of substrates opposite to each other, so as to surround a display area; forming a second seal, which forms a reduced-pressure area outside the first seal, so as to surround the first seal; dropping the liquid crystal onto the inside of a position of the other substrate, which is opposite to the first seal; adhering the other substrate to the one substrate at a reduced-pressure state; and hardening the first and second seals to seal the liquid crystal while pushing the pair of the substrates from the outsides thereof at an atmospheric pressure state, wherein a dropped area of the liquid crystal is defined so as to satisfy a relation represented by an inequality: $2.5b \leq a \leq 5b$ where "a" is an interval between a position, which is opposite to an internal peripheral portion of the first seal on the other substrate, and an external peripheral portion of the dropped area of the liquid crystal, and where "b" is an interval between an external peripheral portion of the first seal and an internal peripheral portion of the second seal on the one substrate.

In the present invention, it is preferable that by defining the relation between the "a" and the "b", the balance of the pushing forces caused in the first reduced-pressure area formed between the first seal and the liquid crystal and caused in the second reduced-pressure area formed between the first and second seals is kept, when the pair of the substrates are adhered to each other and restored to an atmospheric pressure state, and it is also preferable that the gap between the substrates in the peripheral area of the pair of the substrates is made to be uniform.

Furthermore, in the present invention, a structure can be adopted, in which the liquid crystal is continuously dropped onto at least a rectangular area where a distance between each side of the rectangular area and each side of the first seal opposite to the corresponding one of the rectangular area is approximately constant. Additionally, in the present invention, a structure can be adopted, in which the liquid crystal is continuously dropped onto at least a scroll-patterned area where a distance between each side of the outermost peripheral portion thereof and each side of the first seal opposite to the corresponding one of the scroll-patterned area is approximately constant.

In the present invention, a structure can be adopted, in which the liquid crystal is continuously dropped onto at least a rectangular wave-shaped area where a distance between each of the both outermost sides thereof and each of the sides of the first seal opposite to the corresponding one of the outermost sides is approximately constant, and a distance between one of upper and lower sides thereof and a side of the first seal opposite to the corresponding one of the upper and lower sides thereof is approximately constant. In the present invention, a structure can be adopted, in which the liquid crystal is dropped onto at least a dotted area, in which a distance between each side of the dotted area and each side of the first seal opposite to the corresponding one of the dotted area is approximately constant.

In the present invention, a structure can be adopted, in which first spacers having a predetermined particle diameter are arranged in the display area of one of the pair of the substrates, and second spacers having a particle diameter approximately equal to or more than that of the first spacer are contained in one of the first and second seals.

Still furthermore, in the present invention, a structure can be adopted, in which column-shaped spacers are arranged in a predetermined density in the display area of one of the pair of the substrates, and the column-shaped spacers are arranged in a density equal to or more than that in the display area, in an area between the first and second seals.

DETAILED DESCRIPTION OF THE PREFERRED EMBODIMENTS

The invention will be now described herein with reference to illustrative embodiment. Those skilled in the art will recognize that many alternative embodiments can be accomplished using the teachings of the present invention and that the invention is not limited to the embodiments illustrated for explanatory purposes.

First, embodiments of a method of manufacturing an LCD panel of the present invention will be described in detail with reference to the accompanying drawings.

As described in the prior arts, the dispenser method capable of shortening the injection time of the liquid crystal and reducing the required quantity of the liquid crystal has been used as the method of manufacturing the LCD panel. In this method, the desired gap is formed by pushing the reduced-pressure area by use of the differential pressure in the atmospheric pressure state. Therefore, a peripheral area of the LCD panel needs to be pushed uniformly in sealing the liquid crystal.

However, the balance of the pushing forces between the inside of the first seal and the area between the first and second seals is lost depending on the position of the dropped liquid crystal material. Additionally, the peripheral area of the LCD panel is dented or protruded depending on circumstances.

As a countermeasure to such drawbacks, a method is disclosed in Japanese Patent Laid-Open Hei No. 11(1999)-326922, in which a force exerted by a reduced-pressure area between a first seal (a first seal material 6 in the gazette) and a second seal (a second seal material 9 in the gazette) is controlled properly by setting a distance between the first and second seals to be in a predetermined range (2 to 7 mm).

However, as described above, the gap in the peripheral area of the LCD panel changes depending on the balance of the pushing forces between the reduced-pressure area between the first and second seals and the reduced-pressure area inside the first seal. Therefore, it is impossible to make the gap in the peripheral area of the LCD panel uniform only by defining the distance between the first and second seals.

Accordingly, a relation between an interval between an internal peripheral portion of a first seal for sealing liquid crystal and an outer peripheral portion of the dropped area of the liquid crystal, and an interval between an external peripheral portion of the first seal and an internal peripheral portion of a second seal located outside thereof is defined based on an experiment. Thus, the balance of the pushing forces between reduced-pressure areas inside/outside the first seal is kept, and a gap between substrates in a peripheral area of the LCD panel is made uniform, thus improving display quality.

First Embodiment

The foregoing embodiments of the present invention will be described further in more detail. A method of manufacturing an LCD panel according to a first embodiment of the present invention will be described with reference to FIG. 3 to FIG. 13B.

Figure 1:
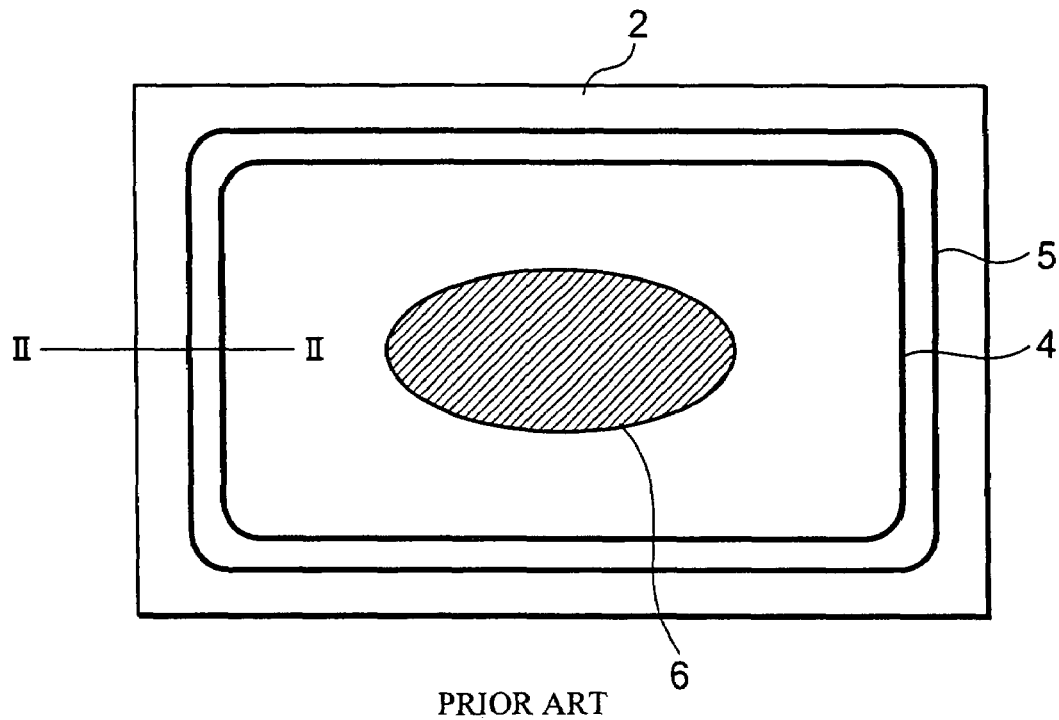
FIG. 1 depicts a schematic plan view showing a state where a liquid crystal material is dropped in a conventional method of manufacturing an LCD panel.
Figure 2:
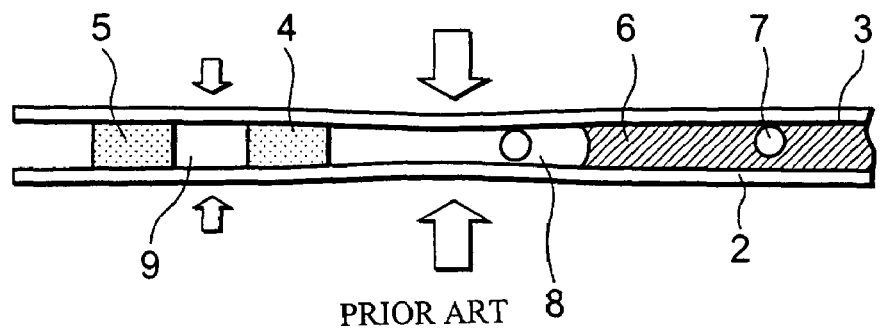
FIG. 2 depicts a schematic sectional view showing a state where the liquid crystal material is sealed in the convention method of manufacturing an LCD panel.
Figure 3:
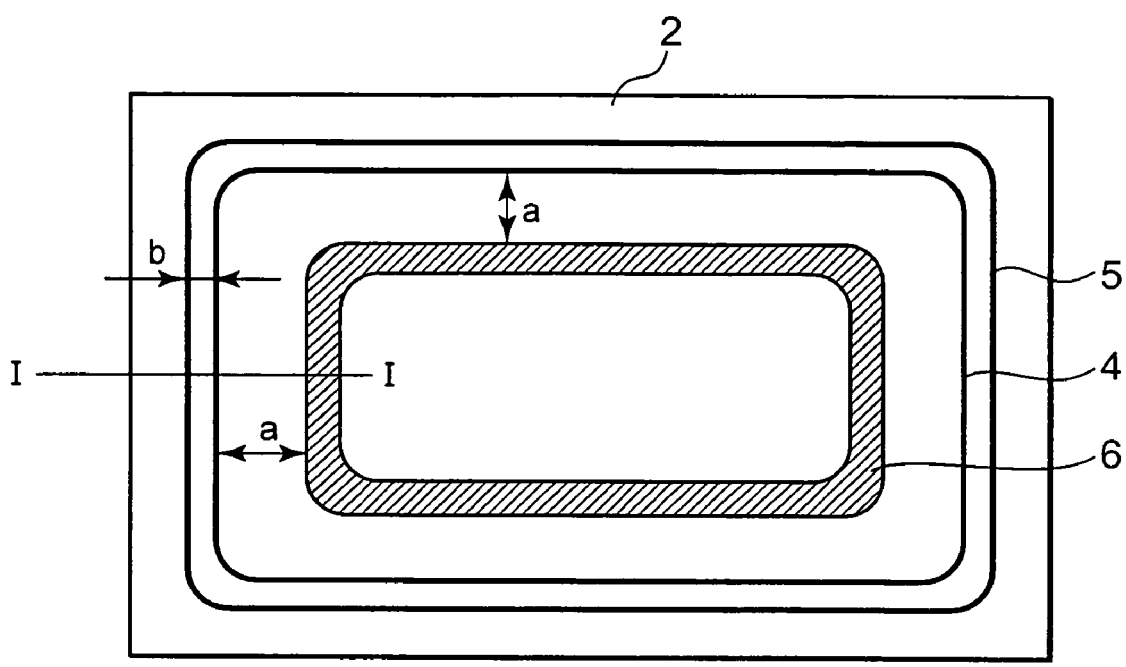
FIG. 3 depicts a schematic plan view showing a state where a liquid crystal material is dropped in a method of manufacturing an LCD panel according to a first embodiment of the present invention.
Figure 4A:
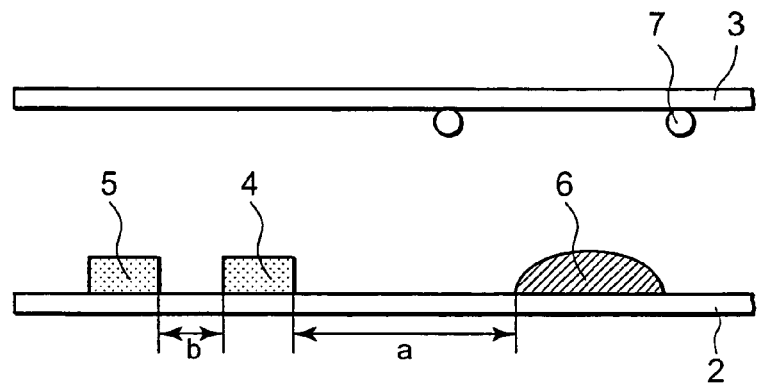
FIG. 4A to FIG. 4C depict sectional views schematically showing manufacturing steps in the method of manufacturing an LCD panel according to the first embodiment of the present invention.
Figure 4B:
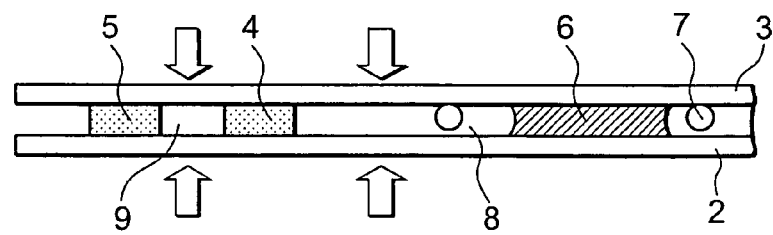
Figure 4C:
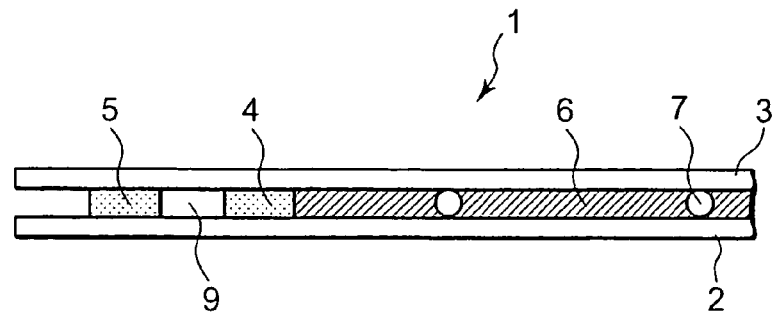

FIG. 3 depicts a plan view showing a state where a liquid crystal material is dropped in a method of manufacturing an LCD panel according to the first embodiment. FIG. 4A to FIG. 4C depict sectional views showing manufacturing steps in the method of manufacturing an LCD panel, which are taken along the line I-I in FIG. 3.

FIG. 5 to FIG. 8 depict plan views showing variations of a method of dropping the liquid crystal material. FIG. 9A to FIG. 11 depict views and a graph for explaining effects of the embodiment. FIG. 12A to FIG. 13B depict sectional views showing variations of a structure of the LCD panel of the embodiment.

Generally, a liquid crystal display panel comprises a TFT substrate in which switching elements such as a TFT (Thin Film Transistor) are formed in a matrix fashion, and an opposite substrate in which a color filter, a black matrix and the like are formed. An alignment film that has been subjected to an alignment treatment is formed on an opposite plane of these substrates. Insulating spacers such as polymer beads, silica beads, and the like which have a predetermined shape, are disposed between the both substrates. As a result, a predetermined gap is formed between the both substrates. Then, an alignment direction of the liquid crystal injected and sealed in the gap is controlled by an electric field generated by an electrode formed at least one of the substrates, and an image is displayed.

Accordingly, in order to improve display quality, the gap needs to be uniform. Thus, the LCD panel is manufactured by the following method, so that a uniform pushing force is applied to substrates opposite to each other when liquid crystal is sealed between them in this embodiment.

First, as shown in FIG. 3, a seal material made of ultraviolet cured resin, thermosetting resin, or the like is coated onto a substrate (herein a first substrate 2) having a surface which has been subjected to an alignment treatment by use of a dispenser or the like. The seal material is coated by use of a dispenser or the like, and a width of the seal material to be coated is about 0.3 to 0.4 mm and a height thereof is about 30 to 40 μm. At the same time, a first seal 4 (main seal) having a closed curved shape is formed so as to surround a display area formed in the first substrate 2. At that time, a second seal 5 (auxiliary seal) having a closed curved shape is formed outside the first seal 4 with a predetermined interval therebetween. An area for sealing a liquid crystal material 6 is defined by this first seal 4, and a reduced-pressure area used in adhering substrates is formed outside the first seal 4 by the second seal 5.

Note that a seal of a hybrid type, which is prepared by mixing ultraviolet cured resin and thermosetting resin, can be used as the seal material. Shapes of the first and second seals 4 and 5 are determined in consideration of a shape of the display area. However, the first and second seals 4 and 5 are herein formed to a rectangular shape or a rectangular shape having four rounded corners so that the first and second seals 4 and 5 have shapes almost similar to that of the display area. A formation method of the first or second seals 4 and 5 is not limited to the one by use of the dispenser, and a screen printing may be also used.

Next, a proper amount of liquid crystal material 6 is dropped onto a predetermined area inside the first seal 4 by use of a dispenser for dropping liquid crystal or the like under a predetermined reduced-pressure atmosphere, so that the liquid crystal material 6 is filled between the substrates in a state where the first seal 4 is squeezed (see FIG. 4A). At this time, in this embodiment, not only an amount of the dropped liquid crystal material 6 but also an area where the liquid crystal material 6 is dropped is controlled.

As shown in FIG. 4A, a dropped area is controlled so that a relation to be described below represented by an inequality: $2.5 \leq a \leq 5b$ is satisfied between an interval "a" between an internal peripheral portion of the first seal 4 and an external peripheral portion of the dropped area of the liquid crystal and an interval "b" between an external peripheral portion of the first area 4 and an internal peripheral portion of the second seal 5.

Next, in a similar manner, spacers 7 such as polymer beads, silica beads and the like are scattered in a display area of a substrate (herein a second substrate 3) having an opposite plane on which an alignment film is formed, and the second substrate 3 is allowed to match the first substrate 2. Then, the second substrate 3 is adhered to the first substrate 2. Thereafter, the first and second seals 4 and 5 are squeezed by a proper amount by imposing a load of, for example, about $0.1 N/mm^2$, and a first reduced-pressure area 8 is formed inside the first seal 4. At the same time, an area surrounded by the first and second seals 4 and 5 is sealed, thus forming a second reduced-pressure area 9. Note that a vacuum degree of a reduced-pressure atmosphere and a degree of applying pressure in the above described steps can be properly changed depending on the states where seals are squeezed, an area of the display area, and the like.

Thereafter, the pressure in the vacuum container is restored to atmospheric pressure. Upon restoring the pressure in the vacuum container to the atmospheric pressure, both of the first reduced-pressure area 8 in the first seal 4 and the second reduced-pressure area 9 between the first and second seals 4 and 5 are kept in a reduced-pressure state. Therefore, the first and second substrates 2 and 3 are pushed from the outsides thereof by the differential pressure between the reduced-pressure and the atmospheric pressure (see FIG. 4B).

Herein, the pushing forces applied to both of the substrates opposite to each other differ depending on the relation between the interval "a" between the internal peripheral portion of the first seal 4 and the external peripheral portion of the dropped area of the liquid crystal material 6 and the interval "b" between the external peripheral portion of the first seal 4 and the internal peripheral portion of the second seal 5. For example, if the interval "b" is larger, the pushing force applied to the second reduced-pressure area 9 becomes larger, and a gap at this portion becomes smaller. In relation to this, a gap inside the first seal 4, that is, a gap in the periphery of the display area becomes larger. On the contrary, if the interval "a" is larger, the pushing force applied to the first reduced-pressure area 8 becomes larger, and the gap in the periphery of the display area becomes smaller.

As described above, if the formation positions of the first and second seals 4 and 5, and the dropped area of the liquid crystal material 6 are not set properly, the gap inside the first seal 4 and the gap outside the first seal 4 differ. Furthermore, if unevenness in the pushing forces applied to the periphery of the LCD panel occurs, unevenness in the gap occurs. As a result, display quality is degraded.

In this embodiment, as described above, the relation between the interval "a" between the internal peripheral portion of the first seal 4 and the external peripheral portion of the dropped area of the liquid crystal material 6 and an interval "b" between the external peripheral portion of the first seal 4 and the internal peripheral portion of the second seal 5 is defined based on an experiment result. For this reason, it is possible to keep the balance of the pushing forces applied to the inside and outside of the first seal 4, and the peripheral area of the LCD panel can be pushed uniformly. When the substrates are left in a state where the pressure is restored to the atmospheric pressure, the liquid crystal material 6 gradually spreads to narrow the first reduced-pressure area 8 and to change the balance of the pushing forces. Then, the states where the first and second seals 4 and 5 are squeezed are influenced significantly depending on an initial state (specifically, states immediately after the substrates are exposed to atmospheric air). For this reason, if the dropped area of the liquid crystal material 6 is defined, it is possible to push the peripheral area of the LCD panel uniformly.

Thereafter, the first and second seals 4 and 5 are hardened by irradiating ultraviolet ray or by heating the substrates. Then, the first and second substrates 2 and 3 are cut at predetermined portions outside the first seal 4, and thus the liquid crystal display panel 1 is formed (see FIG. 4C).

Note that in FIG. 3, the liquid crystal material 6 was dropped so as to form the rectangular shape inside the first seal 4. However, the dropped area of the liquid crystal material 6 is not limited to the shape of FIG. 3.

Specifically, the dropped area of the liquid crystal material 6 can be set optionally as long as an amount of the liquid crystal material 6 to be dropped is enough to fill the liquid crystal material 6 between the substrates in a state where the first seal 4 is squeezed, and as long as the predetermined relation expressed by the inequality: $2.5b \leq a \leq 5b$ is established between the interval "a" between the internal peripheral portion of the first seal 4 and the external peripheral portion of the dropped area of the liquid crystal and the interval "b" between the external peripheral portion of the first seal 4 and the internal peripheral portion of the second seal 5.

Figure 5:
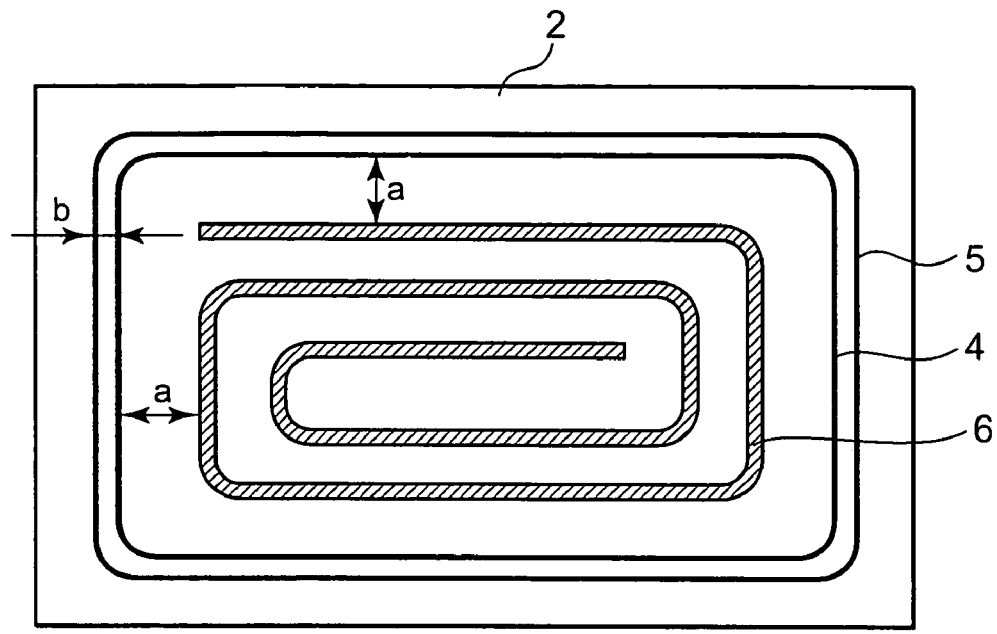
FIG. 5 depicts a plan view showing a variation of a shape of the dropped liquid crystal material in the first embodiment of the present invention.

For example, as shown in FIG. 5, the structure may be also adopted, in which the liquid crystal material 6 is dropped so as to form a scroll pattern. In this case, it is essential only that the interval between the outermost peripheral portion of the dropped area having the scroll pattern and the internal peripheral portion of the first seal 4 satisfies the above described relation, and the shapes of an inner portion of the scroll, the winding number of the scroll, and the like are optional. In this structure, since the liquid crystal material 6 can be coated unicursally as in the case of the structure of FIG. 3, the time required for a dropping operation can be shortened. Additionally, compared to the structure of FIG. 3, the liquid crystal material 6 can be coated onto the entire surface of the display area. Therefore, the present invention has a feature in that it is possible to facilitate the spread of the liquid crystal material 6.

Figure 6:
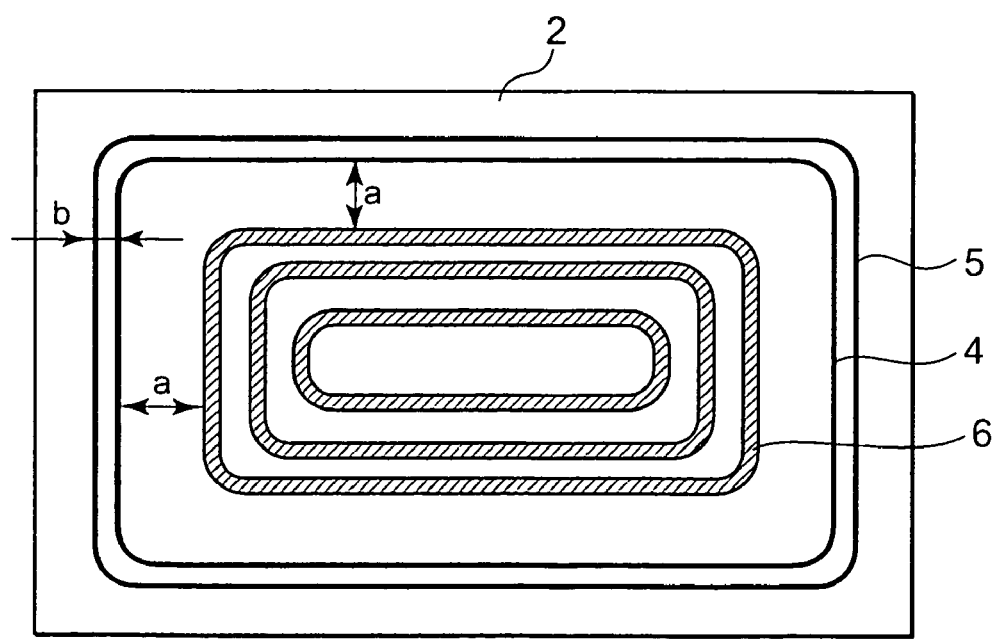
FIG. 6 depicts a plan view showing a variation of a shape of the dropped liquid crystal material in the first embodiment of the present invention.

As shown in FIG. 6, the structure can be also adopted, in which the liquid crystal material 6 is dropped so as to form a ripple shape, that is, a shape that a plurality of similar patterns are combined. In this case, it is essential only that the interval between the external peripheral portion of the outermost pattern of the dropped area and the internal peripheral portion of the first seal 4 satisfies the above described relation, and the shapes of an inner portion of the pattern and the number of combinations of the patterns are optional. In this structure, the liquid crystal material 6 cannot be dropped continuously. However, since the liquid crystal material 6 can be dropped symmetrically with respect to the center of the display area, the present invention has a feature in that the liquid crystal material 6 can be spread uniformly.

Figure 7:
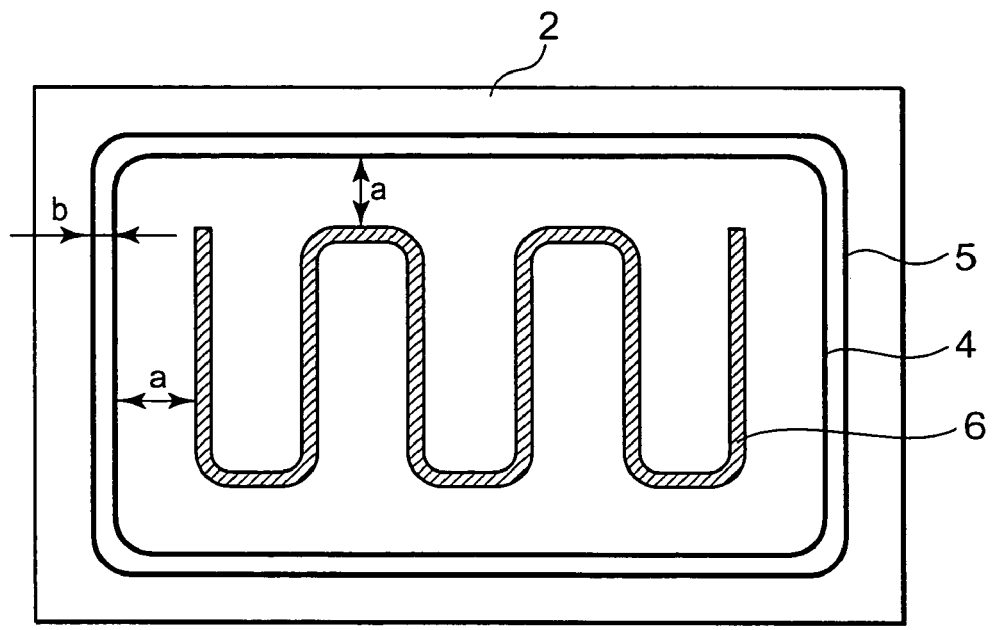
FIG. 7 depicts a plan view showing a variation of a shape of the dropped liquid crystal material in the first embodiment of the present invention.

As shown in FIG. 7, the structure can be also adopted, in which the liquid crystal material 6 is dropped so as to form a rectangular wave shape. In this case, it is essential only that the interval between the external peripheral portion of the sides on both ends of the rectangular wave shape of the dropped area and the internal peripheral portion of the first seal 4 and the interval between the external peripheral portion of the top and bottom of the rectangular wave shape of the dropped area and the internal peripheral portion of the first seal 4 satisfies the above described relation, and the shapes of the waves and the number of the waves are optional. In this structure, since the liquid crystal material 6 can be dropped unicursally as in the case of FIG. 4, the time required for a dropping operation can be shortened.

Figure 8:
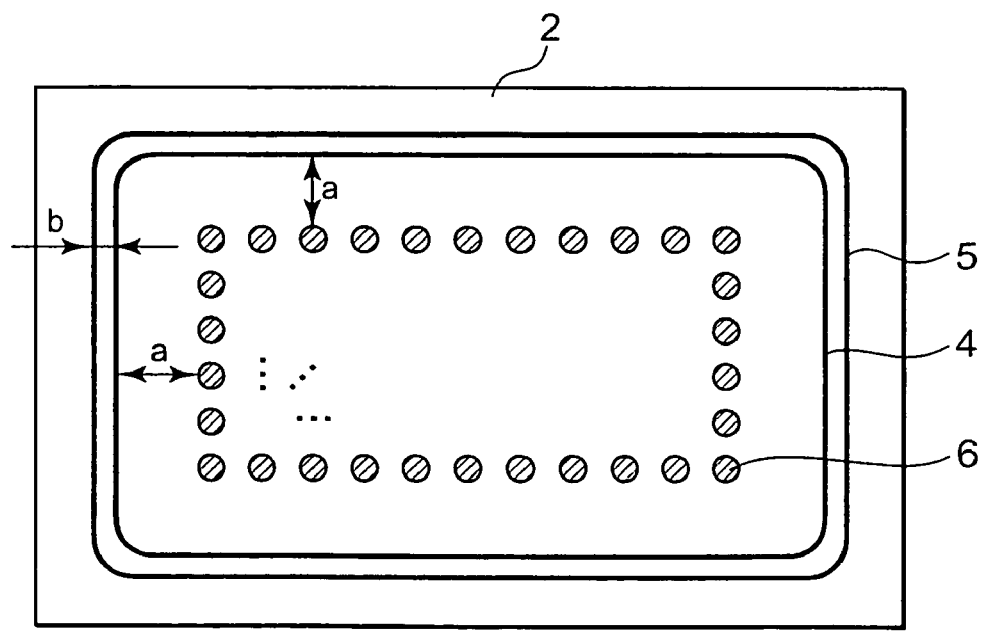
FIG. 8 depicts a plan view showing a variation of a shape of the dropped liquid crystal material in the first embodiment of the present invention.

Furthermore, as shown in FIG. 8, the structure can be also adopted, in which the liquid crystal material 6 is dropped so that the droplets of the liquid crystal material 6 are lined up. In this case, the droplets of the liquid crystal material 6 may be lined up so as to form one dotted line only in the periphery of the dropped area, or may be arrayed in a matrix fashion. In this case, it is essential only that the interval between the external peripheral portion of the outermost line of the droplets of the dropped area and the internal peripheral portion of the first seal 4 satisfies the above described relation, and the sizes of the droplets, the number of the droplets, the interval between the droplets and the arraying shapes are optional. In this structure, though the time required for a dropping operation of the liquid crystal material 6 is long, the dropping operation is easy.

Furthermore, the shapes of the dropped liquid crystal material 6 of FIG. 3, and FIG. 5 to FIG. 8 can be combined. For example, it is also possible that the shapes of the dropped liquid crystal material 6 shown in FIG. 3 and FIG. 5 are combined, the liquid crystal material 6 is dropped to form a rectangular shape only in the outermost of the dropped area, and the interval between the external peripheral portion of the rectangular shape of the dropped area and the internal peripheral portion of the first seal 4 is precisely defined. Thereby, the liquid crystal material 6 can be also dropped inside the rectangular shape so as to form a scroll pattern. By combining the shapes of FIG. 3 and FIG. 8, the droplets of the liquid crystal material 6 can be also dropped inside the rectangular shape of the liquid crystal material 6.

Next, in order to specify the relation which should be satisfied by the interval "a" between the internal peripheral portion of the first seal 4 and the external peripheral portion of the dropped area of the liquid crystal material 6 and the interval "b" between the external peripheral portion of the first seal 4 and the internal peripheral portion of the second seal 5, the following experiment was performed.

Figure 9A:
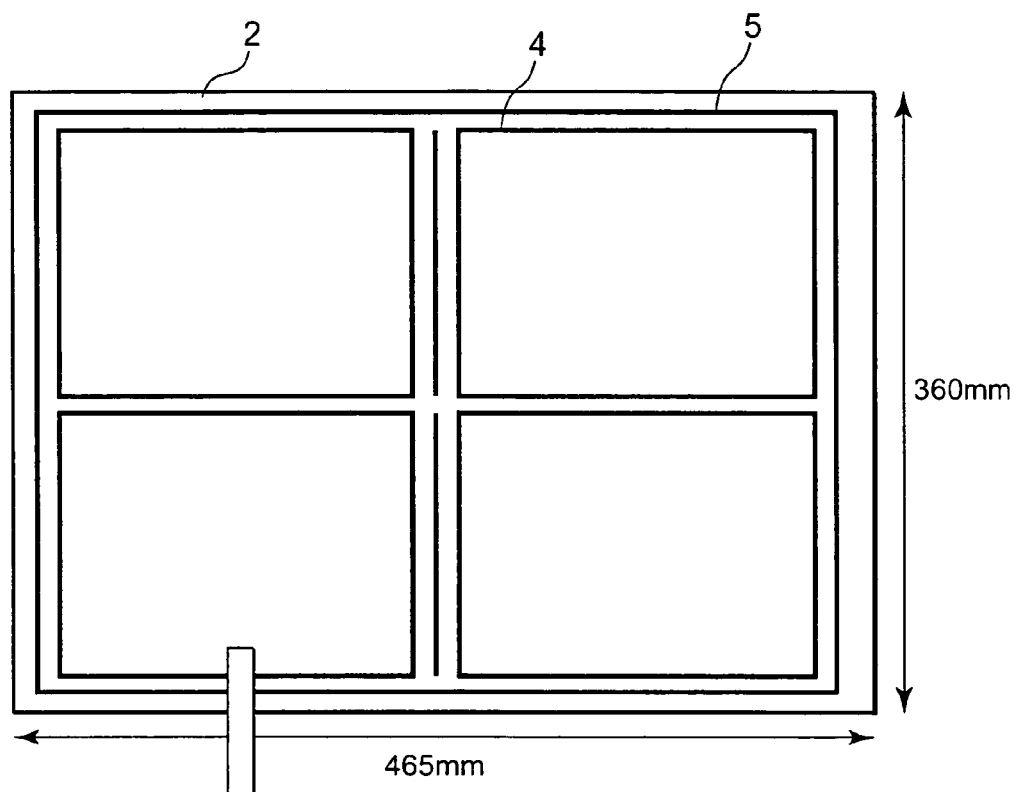
FIG. 9A and FIG. 9B depict plan views showing forms of a sample (first sample) for confirming effects of the present invention.
Figure 9B:
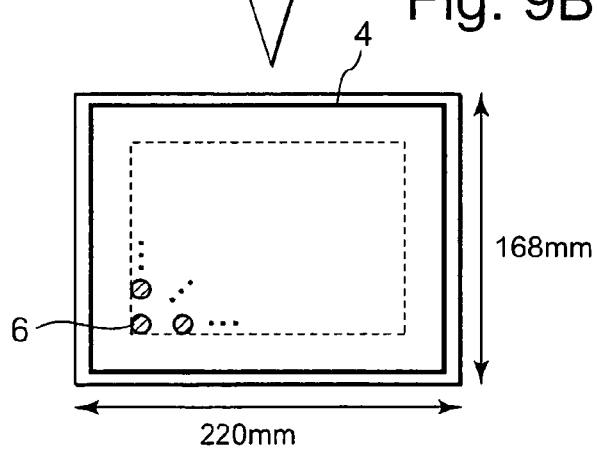

First, as shown in FIG. 9A and FIG. 9B, four first seal s4 were formed in two columns and two rows on the first substrate 2 having a size of 360 mm×465 mm. Next, the second seal 5 was formed so as to surround the four first seals 4 with a distance of 5 μm from the first seals 4. Then, the droplets of the liquid crystal material 6 were dropped in predetermined positions inside the respective first seals 4. Specifically, the weight of each droplet of the liquid crystal material 6 is set to 3.5 mg. The number of the droplets was 6 in the longitudinal direction (up-and-down direction in the drawings), and the number of the droplets was 8 in the lateral direction (left-and-right direction in the drawings). Accordingly, the total number of the droplets was 48.

Thereafter, the second substrate (not shown) was adhered to the first substrate, and then the seal material was hardened. Subsequently, the substrates were cut at the positions outside the first seal 4, thus preparing four first samples (10-inch panel) having a size of 168 mm×220 mm. Then, when the distance "a" between the internal peripheral portion of the first seal 4 and the external peripheral portion of the dropped area was changed, the change in the gap in the periphery of the LCD panel was measured. The gap ranged from the position of the first seal 4 of each panel to the position which was apart from the first seal 4 by 30 mm toward the display area.

Note that the change in the gap was set to an average of unevenness in the gap in the periphery of the LCD panel on the side (inner side) in which the panels are adjacent to each other and on the side (external peripheral side) in which the panels are not adjacent to each other in the arrangement of FIG. 9. Additionally, in order to confirm effects in the constitution for actually manufacturing the LCD panel 1, the structure was adopted in this experiment, in which the four panels were formed on one first substrate 2. However, the same effects can be obtained by the structure in which one LCD panel 1 is formed on one first substrate 2 and by the structure in which the any number of the LCD panels 1 are formed.

For the sake of comparison, the change in the gap was also measured as to a second sample in which the droplets of the liquid crystal material 6 were dropped at 5 positions in the longitudinal direction and at 7 positions in the lateral direction, 35 positions in total. In this case, the interval "a" was 24.61 mm. The change in the gap was also measured as to a third sample in which the liquid crystal material was dropped collectively at the center portion as shown in FIG. 13. In this case, the interval "a" was 40.28 mm.

Figure 10:
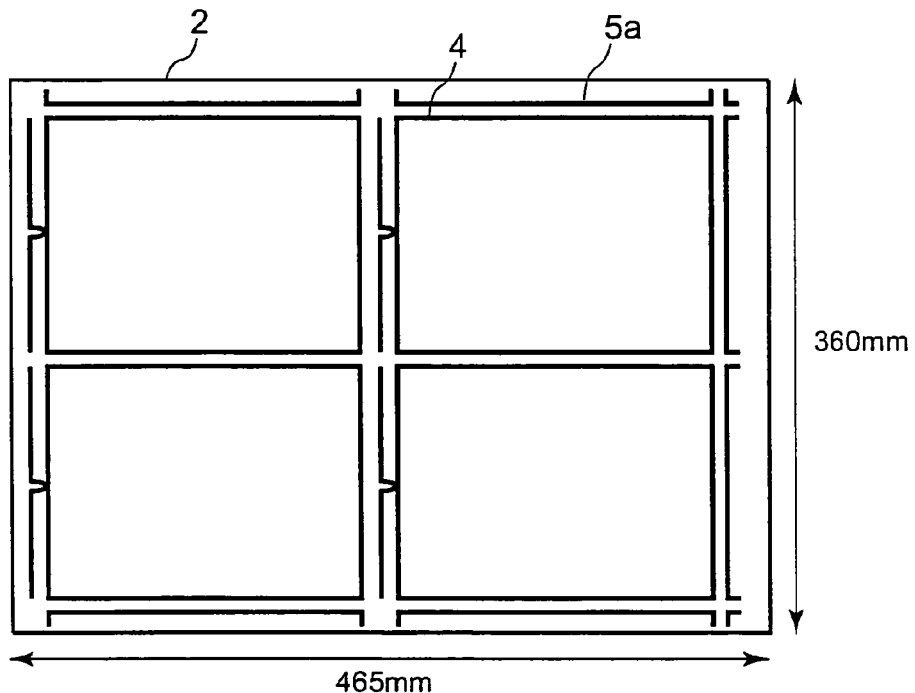
FIG. 10 depicts a plan view showing a form of a sample (fourth sample) for confirming effects of the present invention.

Furthermore, as shown in FIG. 10, the change in the gap was measured as to a fourth sample prepared in the similar manner to that of the first sample in which the second seal 5a was an open pattern. The results of the measurement are shown in FIG. 11.

Figure 11:
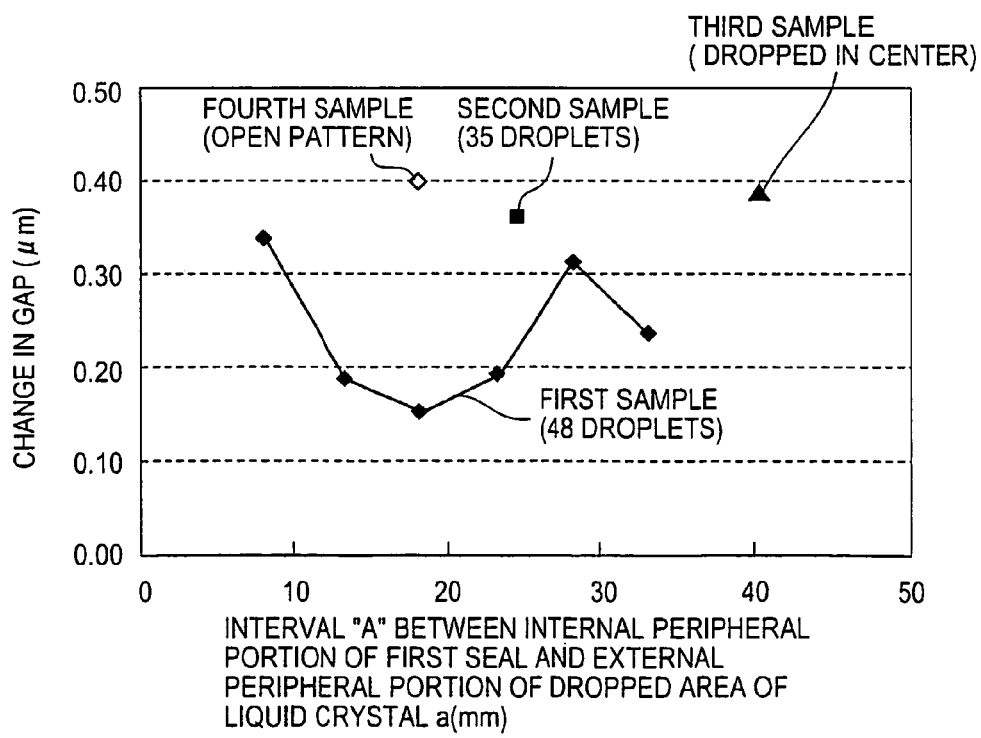
FIG. 11 depicts a graph showing effects of the present invention, specifically a correlation between a change in a gap and an interval "a" between a first seal and an end portion of a dropped area of the liquid crystal.

As apparent from FIG. 11, in the first sample (filled circle in FIG. 11), whether the interval "a" between the internal peripheral portion of the first seal 4 and the external peripheral portion of the dropped area of the liquid crystal is small (for example, 8.2 mm), or large (for example, 28.2 mm), the balance of the pushing forces between the first and second reduced-pressure areas 8 and 9 is lost, and the change in the gap in the periphery of the LCD panel 1 is large.

On the other hand, when the interval "a" ranges approximately from 12.55 mm to 25 mm, specifically, when the interval "b" between the external peripheral portion of the first seal 4 and the internal peripheral portion of the second seal 5 is set to 5 mm, the first and second reduced-pressure areas 8 and 9 are uniformly pushed in the range in which the length of the interval is about 2.5 times to 5 times as long as that of the interval "b". Accordingly, it is proved that the change in the gap in the periphery of the LCD panel 1 is suppressed. Herein, if the change in the gap is 0.2 μm or less, no problem occurs practically, and accordingly the interval "a" is set to be about 2.5 times to 5 times as long as that of the interval "b" in the present invention.

The second sample (filled rectangles in FIG. 11) in which the number of the droplets of the liquid crystal material 6 is smaller or the third sample (filled triangles in FIG. 11) in which the droplet of the liquid crystal material 6 is dropped only onto the center shows a larger change in the gap in the same distance "a" compared to that of the first sample. The reason of the larger change is that the interval "a" cannot be kept constant because of the smaller number of the droplets, and that in some areas the interval "a" is wide and in other areas the interval "a" is narrow. As a result, the reason is considered that an area in which pushing forces lose a balance significantly occurs.

For this reason, it is important that the interval from the first seal 4 can be kept constant in dropping the liquid crystal material 6. It is said that the structure in which the liquid crystal material 6 is dropped so as to form a line is preferable to that in which the liquid crystal material 6 is dropped so as to form a dotted line.

In the fourth sample (open circles in FIG. 11) in which the second seal 5a is an open pattern, the change in the gap in the same distance "a" is larger than that of the first sample. Therefore, the second reduced-pressure area 9 is not formed between the first seal 4 and the second seal 5 by forming the second seal 5a so as to be the open pattern. Accordingly, it is considered that this is because the balance of the pushing forces cannot be kept, and the deformation of the first reduced-pressure area 8 becomes large. Therefore, it is proved that bringing the area between the first and second seals 4 and 5 to a reduced-pressure state is important in view of suppressing the change in the gap.

As described above, according to the method of manufacturing a liquid crystal display panel of this embodiment, the first seal for sealing the liquid crystal material 6 and the second seal 5 for forming the reduced-pressure area outside the first seal 4 are formed. Then, in the dispenser method for dropping the liquid crystal material 6 inside the first seal 4, the interval "a" between the internal peripheral portion of the first seal 4 and the external peripheral portion of the dropped area of the liquid crystal and the interval "b" between the external peripheral portion of the first seal 4 and the internal peripheral portion of the second seal 5 are set so as to satisfy the relation represented by the inequality: $3b \leq a \leq 5b$.

Specifically, by keeping the balance of the pushing forces applied to the inside and outside of the first seal 4, the peripheral area of the LCD panel 1 can be pushed uniformly. Thus, this makes the gap of the peripheral area of the LCD panel 1 uniform, so that the display quality can be improved.

In the above described manufacturing method, it is configured that spacers 7 are scattered in the display area of one of the substrates, and the gap of the display area is regulated by the spacers 7. However, the first and second seals 4 and 5 are more easily squeezed in some cases depending on the pressure of the second reduced-pressure area 9 and the viscosity of the seal material and the liquid crystal material 6.

Figure 12A:
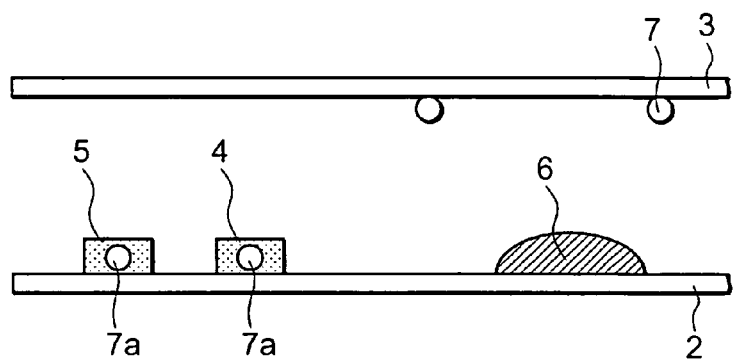
FIG. 12A depicts a sectional view showing a variation of a structure of the LCD panel according to the first embodiment of the present invention.
Figure 12B:
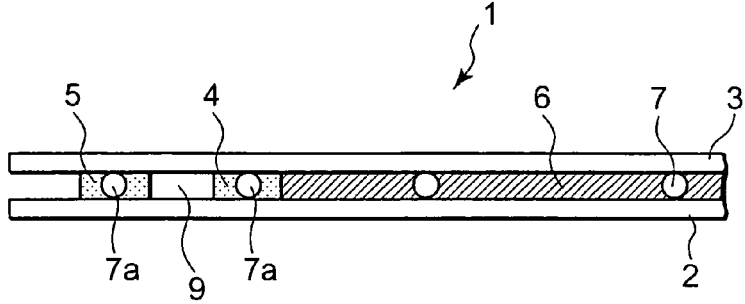
FIG. 12B depicts a sectional view showing a structure of the LCD panel in a subsequent step in manufacturing the LCD panel according to the first embodiment of the present invention shown in FIG. 12A.

In such a case, as shown in FIG. 12A and FIG. 12B, a method in which spacers 7a having a particle diameter which is approximately equal to or more than that of the spacers previously scattered in the seal material are contained, is effectively adopted. With applying such a method, the second reduced-pressure area 9 is never squeezed more than necessary, and the uniformity of the gap can be more improved.

Figure 13A:
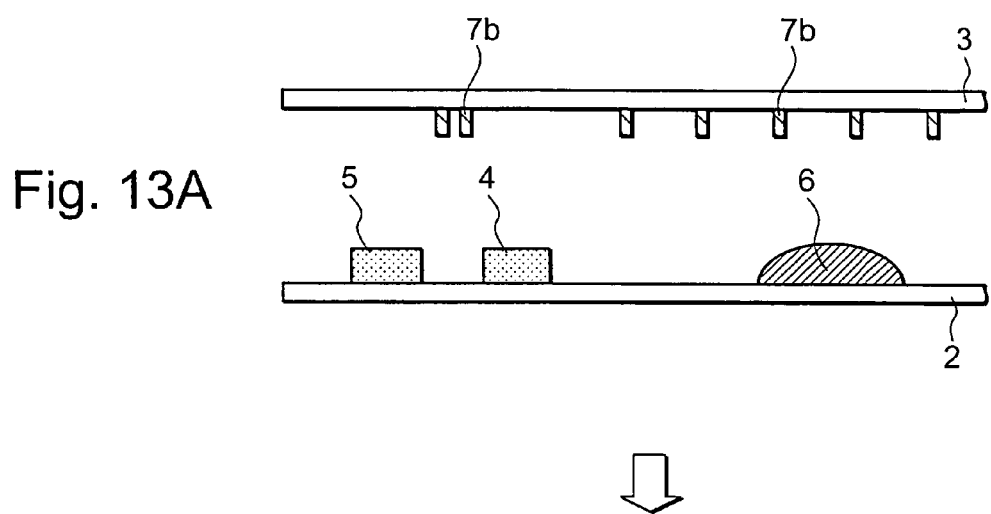
FIG. 13A depicts a sectional view showing a variation of the structure of the LCD panel according to the first embodiment of the present invention.
Figure 13B:
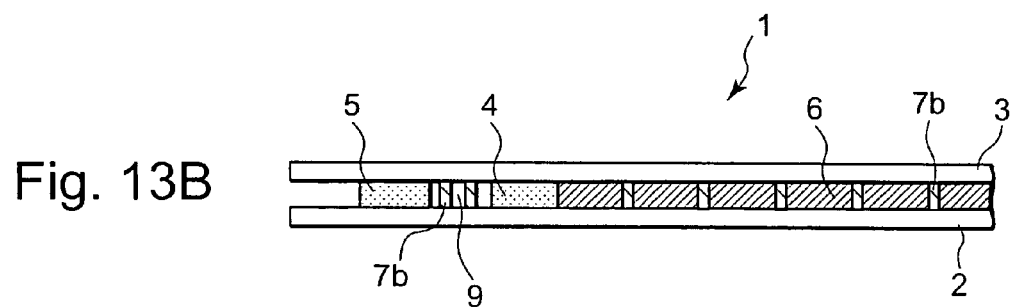
FIG. 13B depicts a sectional view showing a structure of the LCD panel in a subsequent step in manufacturing the LCD panel according to the first embodiment shown in FIG. 13A.

Furthermore, in the case where column-shaped spacers are previously arranged on one of the substrates, the column-shaped spacers 7b can be also arranged in the area between the first and second seals 4 and 5 in a density approximately equal to or more than that of the column-shaped spacers 7b arranged in the display area, as shown in FIG. 13A and FIG. 13B. Also in such a constitution, even when the large pushing force is applied to the second reduced-pressure area 9, a desired gap can be kept. Accordingly, the uniformity of the gap can be improved.

Second Embodiment

Figure 14A:
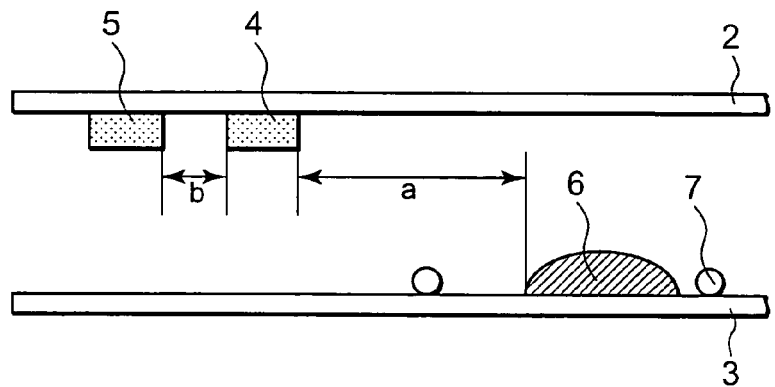
FIG. 14A to FIG. 14C depict sectional views showing manufacturing steps in a method of manufacturing an LCD panel according to a second embodiment of the present invention.
Figure 14B:
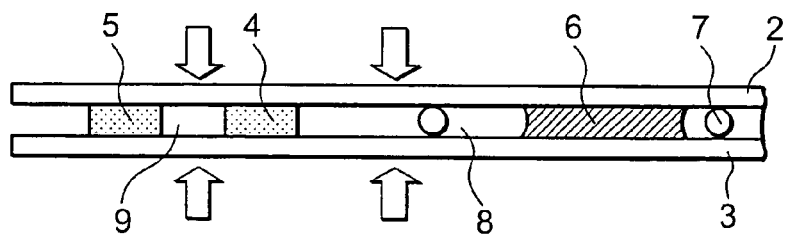
Figure 14C:
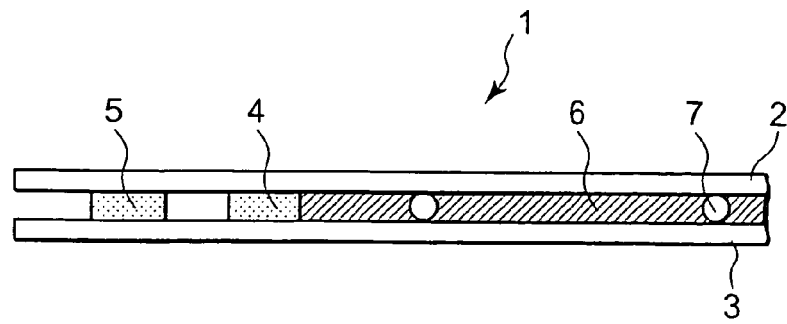

Next, a method of manufacturing an LCD panel according to a second embodiment of the present invention will be described with reference to FIG. 14A, FIG. 14B and FIG. 14C. FIG. 14A, FIG. 14B and FIG. 14C depict sectional views showing manufacturing steps in the method of manufacturing the LCD panel according to the second embodiment. In the above described first embodiment, the liquid crystal material 6 is dropped on the substrate on which the first and second seals 4 and 5 are formed.

On the other hand, the LCD panel 1 can be also manufactured with dropping the liquid crystal material 6 onto the substrates opposite to each other and adhering the substrates to each other, as in the case of the first embodiment. The method of manufacturing the LCD panel according to the second embodiment of the present invention will be described with reference to FIG. 14A, FIG. 14B and FIG. 14C below.

First, in the method of manufacturing the LCD panel according to the second embodiment of the present invention, a seal material made of ultraviolet cured resin, thermosetting resin or the like is coated onto a substrate (herein a first substrate 2) having a surface which has been subjected to an alignment treatment by use of a dispenser or the like, as in the case of the first embodiment. Thereafter, a first seal 4 having a closed curved shape is formed so as to surround a display area formed in the first substrate 2. At the same time, a second seal 5 having a closed curved shape is formed outside the first seal 4 with a predetermined interval therebetween. Note that the seal material may contain spacers as in the case of the first embodiment.

Next, in the method of manufacturing the LCD panel according to the second embodiment of the present invention, spacers 7 such as polymer beads, silica beads and the like are scattered in the display area of the substrate (herein a second substrate 3) having an opposite plane on which an alignment film is formed. Then, under a predetermined reduced-pressure atmosphere, a proper amount of the liquid crystal material 6 is dropped onto a predetermined area inside a position on the second substrate 3, which is opposite to the first seal 4, by use of a dispenser for dropping liquid crystal, or the like (see FIG. 14A). At this time, the liquid crystal material 6 is dropped so as to satisfy the relation represented by an inequality: $2.5b \leq a \leq 5b$, which is the same as that of the first embodiment, between the interval "b" between the external peripheral portion of the first seal 4 and the internal peripheral portion of the second seal 5, which are on the first substrate 2, and the interval "a" between the position opposite to the internal peripheral portion of the first seal 4 and the external peripheral portion of the dropped area of the liquid crystal material, which are on the second substrate 3.

Next, the first and second substrates 2 and 3 are allowed to match with each other, and then adhered to each other. Thereafter, the first and second seals 4 and 5 are squeezed by a proper amount by imposing a load of, for example, about 0.1 N/mm$^2$, and a first reduced-pressure area 8 is formed inside the first seal 4. At the same time, an area surrounded by the first and second seals 4 and 5 is sealed, thus forming a second reduced-pressure area 9.

Thereafter, in the method of manufacturing the LCD panel according to the second embodiment of the present invention, the pressure in a vacuum container is restored to atmospheric pressure as in the case of the first embodiment. Then, the first and second substrates 2 and 3 are pushed from the outsides thereof by the differential pressure (see FIG. 14B). Thereafter, the first and second seals 4 and 5 are hardened by irradiating ultraviolet ray or by heating the substrates, and the first and second substrates 2 and 3 are cut at predetermined position thereof outside the first seal 4, thus forming the LCD panel 1 (see FIG. 14C).

Also with applying such a method, by defining the relation between the interval "a" between the internal peripheral portion of the first seal 4 and the external peripheral portion of the dropped area of the liquid crystal material 6 and the interval "b" between the external peripheral portion of the first seal 4 and the internal peripheral portion of the second seal 5, the balance of the pushing forces applied to the inside and outside of the first seal 4 can be kept. Therefore, the peripheral area of the LCD panel can be pushed uniformly, and the display quality can be improved.

Note that in the descriptions of the first and second embodiments, the example in which the first and second seals 4 and 5 are formed on the same substrate, for example, on the first substrate 2, was cited.

However, the first and second seals 4 and 5 may be formed on different substrates. For example, the first seal 4 may be formed on the first substrate 2, and the second seal 5 may be formed on the second substrate 3. It is apparent that if the fist first and second seals 4 and 5 are formed on the different substrates, the same effects can be exhibited in the present invention.

The above described first and second embodiments can be applied to any LCD panel having the structure in which the liquid crystal is sandwiched between the two substrates opposite to each other. Accordingly, it is apparent that these embodiments can be applied to any LCD panel including a Twisted Nematic (TN) LCD panel, in which transparent electrodes are provided on the respective substrates, and the liquid crystal is driven by electrical field in a longitudinal direction between the substrates, an In-Plane Switching mode (IPS) LCD panel, in which comb-shaped electrodes are provided on one of the substrates, and the liquid crystal is driven by electric field between the comb-shaped electrodes, and the like.

As described above, according to the present invention, in the method of manufacturing the LCD panel using the dispenser method, it is possible to improve the display quality by making uniform the gap between the substrates in the peripheral area of the LCD panel.

The reason of this is as follows. In the structure in which the second seal for surrounding the first seal is provided outside the first seal for surrounding the display area, the relation between the interval between the internal peripheral portion of the first seal and the external peripheral portion of the dropped area of the liquid crystal and the interval between the external peripheral portion of the first seal and the internal peripheral portion of the second seal is defined so that the balance of the pushing forces between the reduced-pressure areas is kept. Thus, the peripheral area of the LCD panel can be pushed uniformly.

It is apparent that the present invention is not limited to the above embodiments, but may be modified and changed without departing from the scope and spirit of the invention.

What is claimed is:

1. A method of manufacturing at least one liquid crystal panel or plural liquid crystal panels each having a double seal structure, comprising the steps of:

forming a first seal in a shape of a closed loop, which defines an area for sealing a liquid crystal, on one of a pair of substrates opposite to each other, so as to surround a display area;

forming a second seal in a shape of a closed loop, which forms a reduced-pressure area, outside the first seal so as to surround the first seal and form a double seal structure;

dropping the liquid crystal onto any of a predetermined area inside the first seal and a predetermined area inside of a position of the other substrate, the position being opposite to the first seal;

adhering the one substrate to the other substrate at a reduced-pressure state; and hardening the first and second seals to seal the liquid crystal while pushing the pair of the substrates from the outsides thereof at an atmospheric pressure state, wherein a dropped area of the liquid crystal is defined so as to satisfy relations represented by inequalities: $2.5b \leqq a1 \leqq 5b$ and $2.5b \leqq a2 \leqq 5b$ where "a1" is an interval between an internal peripheral portion of the first seal and an outermost portion of the dropped area of the liquid crystal along an entire area therebetween, "a2" is an interval between a position, which is opposite to an internal peripheral portion of the first seal on the other substrate, and an outermost portion of the dropped area of the liquid crystal along an entire area therebetween, and "b" is an interval between an external peripheral portion of the first seal and an internal peripheral portion of the second seal, and wherein said double seal structure remains as part of said liquid crystal panel.

2. The method of manufacturing a liquid crystal panel according to claim 1, wherein by defining the relations between "a1" and "b" and between "a2" and "b", the balance of the pushing forces respectively caused in a first reduced-pressure area formed between the first seal and the liquid crystal and caused in a second reduced-pressure area formed between the first and second seals is kept, when the pair of the substrates are adhered to each other and restored to in an atmospheric pressure state, and thus a gap between the substrates in an entire peripheral area of the pair of the substrates is made to be uniform.

3. The method of manufacturing a liquid crystal panel according to claim 1, wherein the liquid crystal is continuously dropped onto at least a rectangular area where a distance between each side of the rectangular area and each side of the first seal opposite to the corresponding one of the rectangular area is approximately constant.

4. The method of manufacturing a liquid crystal panel according to claim 2, wherein the liquid crystal is continuously dropped onto at least a rectangular area where a distance between each side of the rectangular area and each side of the first seal opposite to the corresponding one of the rectangular area is approximately constant.

5. The method of manufacturing a liquid crystal panel according to claim 1, wherein the liquid crystal is continuously dropped onto at least a rectangular wave-shaped area where a distance between each of the both outermost sides thereof and each of the sides of the first seal opposite to the corresponding one of the outermost sides is approximately constant, and a distance between one of upper and lower sides thereof and a side of the first seal opposite to the corresponding one of the upper and lower sides thereof is approximately constant.

6. The method of manufacturing a liquid crystal panel according to claim 2, wherein the liquid crystal is continuously dropped onto at least a rectangular wave-shaped area where a distance between each of the both outermost sides thereof and each of the sides of the first seal opposite to the corresponding one of the outermost sides is approximately constant, and a distance between one of upper and lower sides thereof and a side of the first seal opposite to the corresponding one of the upper and lower sides thereof is approximately constant.

7. The method of manufacturing a liquid crystal panel according to claim 1, wherein the liquid crystal is dropped onto at least a dotted area, in which a distance between each side of the dotted area and each side of the first seal opposite to the corresponding one of the dotted area is approximately constant.

8. The method of manufacturing a liquid crystal panel according to claim 2, wherein the liquid crystal is dropped onto at least a dotted area, in which a distance between each side of the dotted area and each side of the first seal opposite to the corresponding one of the dotted area is approximately constant.

9. The method of manufacturing a liquid crystal panel according to claim 1, wherein first spacers having a predetermined particle diameter are arranged in the display area of one of the pair of the substrates, and second spacers having a particle diameter approximately equal to or more than that of the first spacer are contained in one of the first and second seals.

10. The method of manufacturing a liquid crystal panel according to claim 2, wherein first spacers having a predetermined particle diameter are arranged in the display area of one of the pair of the substrates, and second spacers having a particle diameter approximately equal to or more than that of the first spacer are contained in one of the first and second seals.

11. The method of manufacturing a liquid crystal panel according to claim 1, wherein column-shaped spacers are arranged in a predetermined density in the display area of one of the pair of the substrates, and the column-shaped spacers are arranged in a density equal to or more than that in the display area, in an area between the first and second seals.

12. The method of manufacturing a liquid crystal panel according to claim 2, wherein column-shaped spacers are arranged in a predetermined density in the display area of one of the pair of the substrates, and the column-shaped spacers are arranged in a density equal to or more than that in the display area, in an area between the first and second seals.

13. A method of manufacturing at least one liquid crystal panel having a double seal structure, comprising the steps of:
forming a first seal in a shape of a closed loop, which defines an area for sealing a liquid crystal, on one of a pair of substrates opposite to each other, so as to surround a display area;
forming a second seal in a shape of a closed loop, which forms a reduced-pressure area, outside the first seal so as to surround the first seal and form a double seal structure;
dropping the liquid crystal onto any of a predetermined area inside the first seal and a predetermined area inside of a position of the other substrate, the position being opposite to the first seal, said liquid crystal having at least one geometric shape having a top, a bottom and two sides and defined by continuous or discontinuous lines;
adhering the one substrate to the other substrate at a reduced-pressure state; and
hardening the first and second seals to seal the liquid crystal while pushing the pair of the substrates from the outsides thereof at an atmospheric pressure state,
wherein a dropped area of the liquid crystal is defined so as to satisfy relations represented by inequalities: $2.5b \leq a1 \leq 5b$ and $2.5b \leq a2 \leq 5b$ where "a1" is an interval between an internal peripheral portion of the first seal and an outermost portion of the dropped area of the liquid crystal along said top, said bottom and said two sides, "a2" is an interval between a position, which is opposite to an internal peripheral portion of the first seal on the other substrate, and an outermost portion of the dropped area of the liquid crystal along said top, said bottom and said two sides, and "b" is an interval between an external peripheral portion of the first seal and an internal peripheral portion of the second seal, and
wherein said double seal structure remains as part of said liquid crystal panel.

* * * * *

UNITED STATES PATENT AND TRADEMARK OFFICE
CERTIFICATE OF CORRECTION

PATENT NO.        : 7,623,215 B2                                    Page 1 of 1
APPLICATION NO.   : 10/960500
DATED             : November 24, 2009
INVENTOR(S)       : Toshihiko Motomatsu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 256 days.

Signed and Sealed this

Fourteenth Day of December, 2010

David J. Kappos
*Director of the United States Patent and Trademark Office*